(No Model.)
J. R. ANTHONY.
FERTILIZER DISTRIBUTER.
No. 278,483. Patented May 29, 1883.
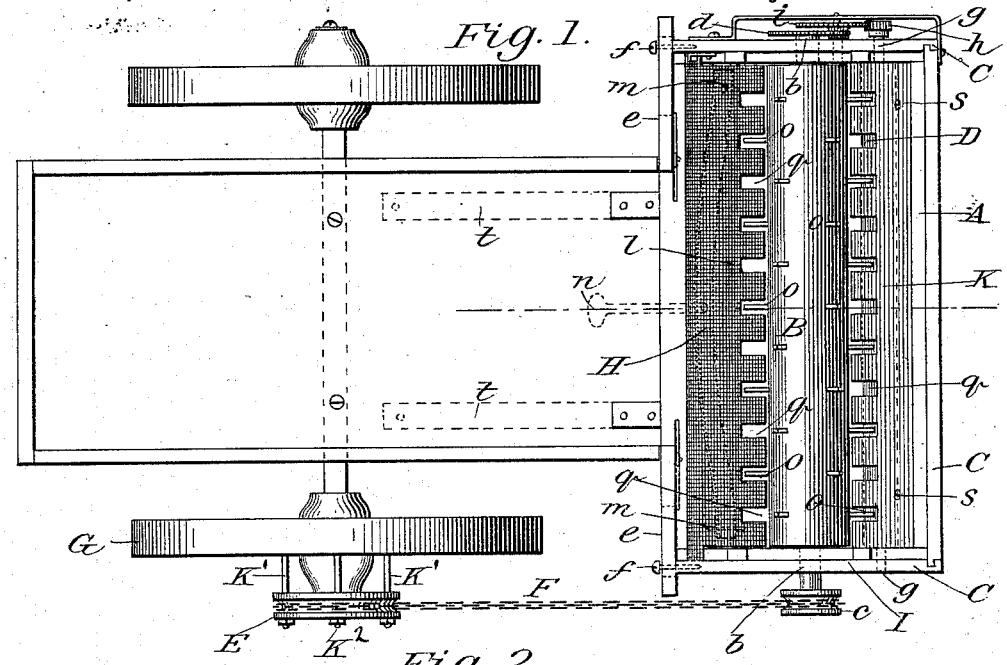
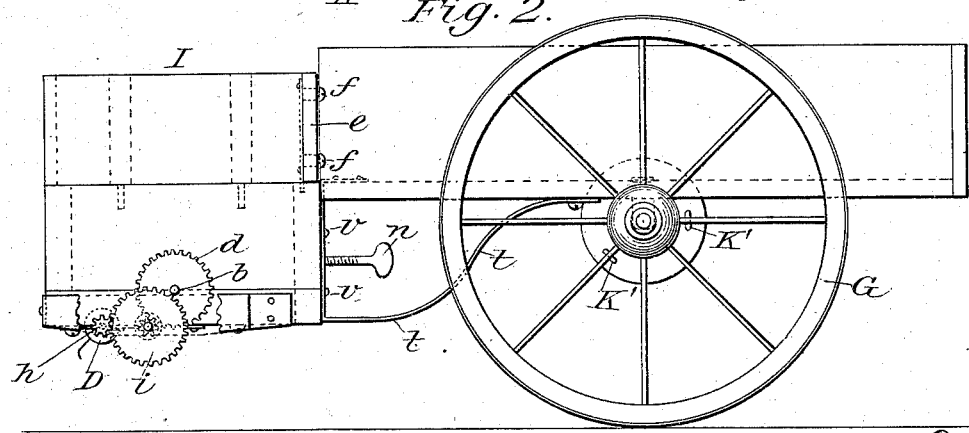
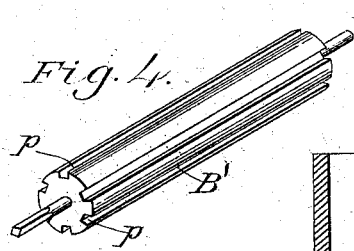
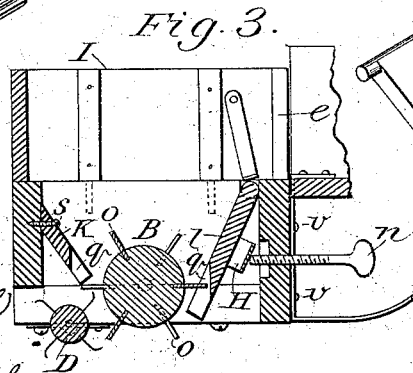
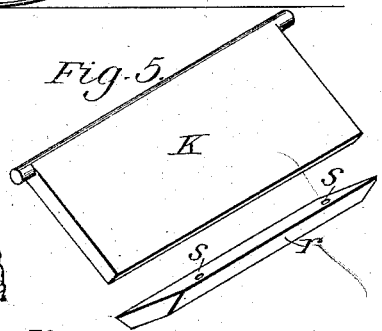
Witnesses:
Mary A. McGill
Mary J. McGill
Inventor:
John R. Anthony

UNITED STATES PATENT OFFICE.

JOHN R. ANTHONY, OF SHERMAN CITY, KANSAS.

FERTILIZER-DISTRIBUTER.

SPECIFICATION forming part of Letters Patent No. 278,483, dated May 29, 1883.

Application filed September 1, 1882. (No model.)

*To all whom it may concern:*

Be it known that I, JOHN RUSSELL ANTHONY, of Sherman City, in the county of Cherokee and State of Kansas, have invented and discovered a new and Improved Machine for the Purpose of Distributing Manures, Fertilizers, and like Substances; and I do hereby declare that the following is a full, clear, and exact description of the same.

The object of my invention is to provide a manure-distributer so constructed that it may be attached to an ordinary wagon or cart, and be so operated, in connection therewith, as to equally and evenly distribute manure, fertilizers, or other substances over the surface of the ground.

The invention consists in the construction hereinafter set forth.

In the accompanying drawings, forming part of this specification, Figure 1 is a top view of my invention, and Fig. 2 a side elevation; Fig. 3, a transverse section; Fig. 4, a modification of the main cylinder; Fig. 5, a detail perspective.

The frame A, in which the cylinders B B' are placed and operated, is made ordinarily of common two-inch lumber framed into an oblong square box of the desired depth, in which is placed the cylinder B, as shown in Fig. 1, or, when desired, the cylinder B' shown in Fig. 4. Such cylinder has the journals $a$ $a'$, working in bearings $b$ $b$, one of said journals being extended and carrying the pulley $c$, and the other extended and carrying a cog-wheel, $d$. The side-boards C, Fig. 1, are fitted to top of frame A, with movable or adjustable open side-boards $e$, fitting to the open end of wagon-box, said boards $e$ being provided with slots, in which screws are driven at $ff$, Fig 1, so that the opening may be widened or narrowed to suit the width of wagon-box. The small fine-toothed cylinder D, Figs. 1 and 2, is let into the frame A, Fig. 1, with gudgeons $g$ $g$, Fig. 1, and pinion cog-wheel $h$, Figs. 1 and 2, which is geared with cog-wheels $i$, Figs. 1 and 2, and made to revolve at the rate of sixteen to one. The driving-pulley C, Figs. 1 and 2, is connected with the driving wheel or pulley E by band, belt, or chain, F. Said pulley or driving wheel E is attached firmly to wagon-wheel G by three or more hooked bolts, K' K' K', Fig. 1, the hooks of which catch onto the spokes of the wagon-wheel G, the straight end of said bolt being fitted with screw and nut, the bolt passing through pulley E, and nut screwed down at $K^2$ $K^2$ $K^2$, Fig. 1. This adapts the pulley to be taken off when the fertilizer is to be removed. The spring H fastens to the under side of concave slat $l$ by screw and staple $m$ $m$. Against the back of said spring works a thumb-screw, $n$, which presses on the spring H and throws the concave slat $l$ forward, regulating the amount of material passing from the hopper or box I, which box is formed of the side-boards C, Fig. 1. The cylinders B B' are made, one, B, with teeth $o$ $o$, and the other, B', with longitudinal grooves $p$ $p$, the teeth for pulverizing coarse substances and grooves for emptying lime, plaster, &c.

K K are concave slats, that fit into the main frame A, Fig. 1, the one for coarse material with plain surface also used with the grooved cylinder for lime, plaster, &c., the one with cross-slots $q$, Fig. 1, used for fine or well-rotted manure.

In using the grooved cylinder the beveled-edged slat $r$, Fig. 5, is adjusted in the back of the machine behind the cylinder B, and held in place by screws $s$ $s$.

The machine is attached to wagon-box by supporting-bars $t$ $t$, one end bent to fasten to bottom of wagon-box with screws on upper side, and other end passing down and turning back to under side of wagon-box, also fastening with screws. The bars $t$ $t$ are screwed fast to the frame A at $v$ $v$, Fig. 2, all of which is adjusted and used as desired for the specified purpose.

I claim—

The side-boards C and adjustable open side-boards $e$, in combination with the frame A, whereby said frame can be adjusted to different wagons, as set forth.

JOHN R. ANTHONY.

Witnesses:
B. W. PERKINS,
J. E. BRYAN.